(12) United States Patent
Ho et al.

(10) Patent No.: US 11,767,495 B2
(45) Date of Patent: Sep. 26, 2023

(54) SYSTEMS AND METHODS FOR MANUFACTURING SOLID GRANULES

(71) Applicant: YFY Consumer Products, Co., Dover, DE (US)

(72) Inventors: Yi-Da Ho, Taipei (TW); Hsien-Ming Kwo, Taipei (TW); Hsing-Nan Chen, Taipei (TW)

(73) Assignee: YFY CONSUMER PRODUCTS, CO., Dover, DE (US)

( * ) Notice: Subject to any disclaimer, the term of this patent is extended or adjusted under 35 U.S.C. 154(b) by 198 days.

(21) Appl. No.: 17/198,622

(22) Filed: Mar. 11, 2021

(65) Prior Publication Data

US 2021/0284938 A1    Sep. 16, 2021

Related U.S. Application Data

(63) Continuation-in-part of application No. 16/930,009, filed on Jul. 15, 2020, now Pat. No. 11,499,124.
(Continued)

(51) Int. Cl.
*C11D 11/00* (2006.01)
*C11D 17/06* (2006.01)
(Continued)

(52) U.S. Cl.
CPC ............... *C11D 17/06* (2013.01); *C11D 1/28* (2013.01); *C11D 3/38672* (2013.01); *C11D 3/505* (2013.01)

(58) Field of Classification Search
None
See application file for complete search history.

(56) References Cited

U.S. PATENT DOCUMENTS

| 5,318,733 A | 6/1994 | Carduck et al. |
| 5,480,626 A * | 1/1996 | Klasen ............... B01J 37/0063 264/141 |

(Continued)

FOREIGN PATENT DOCUMENTS

| CN | 101955855 A | 1/2011 |
| CN | 101985323 A | 3/2011 |

(Continued)

OTHER PUBLICATIONS

SU 1082477-A1, Kazanskij et al. published Mar. 30, 1984.*
Japanese Office Action; Application No. 2021-568710; dated Sep. 16, 2022; 9 Pages.

*Primary Examiner* — Lorna M Douyon
(74) *Attorney, Agent, or Firm* — Husch Blackwell LLP

(57) ABSTRACT

A method of manufacturing a solid granule for use as or in a cleaning agent includes providing an anionic surfactant component having at least one anionic sulfonate surfactant and at least one anionic fatty alcohol-based sulfate surfactant; providing a granule-forming agent; mixing the anionic surfactant component and the granule-forming agent into a solid mixture; receiving the solid mixture in a granulation device, the granulation device having a first roller cutter and a second roller cutter, the first roller cutter includes a plurality of first blades and a plurality of first grooves, the second roller cutter having a plurality of second blades and a plurality of second grooves; cutting the solid mixture into a rough granule by cooperating the first blades with the second blades; and polishing the rough granule into the solid granule by friction rubbing between the first grooves and the second grooves.

19 Claims, 5 Drawing Sheets

Related U.S. Application Data

(60) Provisional application No. 62/989,051, filed on Mar. 13, 2020.

(51) Int. Cl.
    *C11D 1/28*     (2006.01)
    *C11D 3/386*     (2006.01)
    *C11D 3/50*     (2006.01)
    *B29B 9/02*     (2006.01)

(56) References Cited

U.S. PATENT DOCUMENTS

| | | | |
|---|---|---|---|
| 6,635,610 | B1 | 10/2003 | Tatsuno et al. |
| 7,186,678 | B2 | 3/2007 | Weuthen et al. |
| 10,294,445 | B2 | 5/2019 | Brandt Sanz |
| 10,550,357 | B2 | 2/2020 | Somerville Roberts et al. |
| 2009/0215664 | A1 | 8/2009 | Raehse |
| 2013/0281346 | A1* | 10/2013 | Keningley .......... C11D 17/0039 510/324 |
| 2013/0281349 | A1* | 10/2013 | Batchelor .............. C11D 3/046 510/357 |
| 2015/0065413 | A1* | 3/2015 | Batchelor ................ C11D 1/83 510/394 |
| 2018/0200922 | A1 | 7/2018 | DeFelice et al. |
| 2018/0201783 | A1 | 7/2018 | DeFelice et al. |

FOREIGN PATENT DOCUMENTS

| | | |
|---|---|---|
| CN | 103210072 A | 7/2013 |
| EP | 2162522 A1 | 3/2010 |
| JP | 2008050411 A | 3/2008 |
| JP | 2012122067 A | 6/2012 |
| SU | 1082477 A1 * | 3/1984 |
| WO | 9400544 A1 | 1/1994 |

* cited by examiner

SYSTEMS AND METHODS FOR MANUFACTURING SOLID GRANULES

CROSS-REFERENCE TO RELATED APPLICATIONS

This patent application is a continuation-in-part of U.S. application Ser. No. 16/930,009, filed on Jul. 15, 2020, which claims priority to U.S. Application Ser. No. 62/989,051, filed on Mar. 13, 2020, the contents of which are incorporated herein by reference in their entirety.

TECHNICAL FIELD

The present teachings relate generally to cleaning agents, and more specifically to systems and methods for manufacturing solid granules used for a cleaning agent.

BACKGROUND

It is known that various cleaning applications, such as laundry, warewashing, and surface cleaning, utilize powders that are manually scooped into water and dissolved. The resulting cleaning solution is applied to the surface of the article being cleaned. Such powders should exhibit good flow properties, good dispensing, and good dissolving capability in wash water. Also cleaning products should prevent or at least minimize the occurrence of agglomeration. Traditional methods and systems for preparing detergent compositions cannot satisfy the above requirements.

For example, Chinese Patent Publication No. 101955855 discloses a method for preparing a spherical detergent composition with good solubility, comprising the following steps: (a) mixing cleaning components with water to form a mixture, wherein the cleaning components include anionic surfactants and nonionic surfactants, disintegrants and additives; (b) inputting the mixture into an extruder to obtain thin strips with a diameter of 0.5 to 5 mm; and (c) making the thin strips pass through a centrifugal spheronizer, which performs granulation treatment to obtain a spherical detergent composition with a particle size of 0.05 to 5 mm and a bulk density of 0.6 to 1.8 g/mL. However, this method, through the centrifugal spheronizer, can only obtain a spherical detergent composition with a particle size of 5 mm or less and a sphericity less than 0.8.

When the particle size of the spherical detergent composition is less than 5 mm, functional materials (such as enzymes) or volatile functional materials (such as essential oils) that are sensitive to air or moisture cannot be effectively enclosed in the spherical detergent composition. As a result, it is relatively easy for the functional materials to lose their strength or effectiveness or worse, escape during storage. In addition, when the sphericity of the spherical detergent composition is less than 0.8, the breakage of the spherical detergent composition is likely to occur due to the existence of edges and corners of the spherical detergent composition, especially in the case of collision during transportation or packaging. As such, the functional materials enclosed in the spherical detergent composition are likely exposed to air or moisture, resulting in loss of the functional materials or loss of the functionality of the functional materials.

Thus, there exists a need for an improved system and method for manufacturing solid granules used for a cleaning agent.

SUMMARY

The needs set forth herein as well as further and other needs and advantages are addressed by the present embodiments, which illustrate solutions and advantages described below.

It is an object of the present teachings to provide a method and system to manufacture cleaning granules which are uniform or substantially uniform in shape and/or size. As one example, the cleaning granules have a spherical or substantially spherical shape. The term "substantially" used herein with respect to the shape of the cleaning granules means that the sphericity (i.e., the measure of how closely the shape of an object resembles that of a perfect sphere) of the cleaning granules is at least 0.85, and preferably at least 0.90, and more preferably at least 0.95.

It is another object of the present teachings to provide a method and system of manufacturing cleaning granules which have a spherical or substantially spherical shape with a diameter of at least 5 mm.

It is another object of the present teachings to provide a method and system of manufacturing cleaning granules that contain and/or encapsulate functional material(s) in a manner which prevents or at least minimizes degradation, especially during storage and transportation. In particular, through the process of manufacturing, the functional material(s) present around and/or in the cleaning granule are able to better retain their cleaning function, stability, and effectiveness until use, and are less likely to experience weakening strength or escape from the cleaning granule.

It is another object of the present teachings to provide a method and system of manufacturing cleaning granules in a manner which prevents or at least minimizes breakdown due to collisions during transportation or packaging, and thus, the functional material(s) enclosed therein will not be exposed to air or moisture prior to a cleaning action.

It is a further object of the present teachings to provide a method and system of manufacturing a cleaning granule which possesses good fluidity (flow properties), is not sticky (e.g., little to no adhesive force such that one granule does not stick to other granules and agglomerate), and has characteristics of low dosage and high cleaning power during use.

It is a further object of the present teachings to provide a method and system of manufacturing a tablet or pod containing one or more granules which are non-sticky (e.g., do not stick to other granules and agglomerate), possess good fluidity (flow properties), and have characteristics of low dosage and high cleaning power during use.

It is also an object of the present teachings to provide a method and system of making a laundry detergent, dishwasher cleaner, dishwasher detergent, dish cleaner, kitchen cleaner, bathroom cleaner, toilet cleaner, sink cleaner, tub cleaner, tile cleaner, carpet/rug cleaner, all-purpose cleaner, floor cleaner, multi-surface cleaner, hand wash, and body wash each comprising one or more granules according to the present teachings.

These and other objects of the present teachings are achieved by a method of manufacturing a solid granule for use as or in a cleaning agent. The method comprises providing an anionic surfactant component having at least one anionic sulfonate surfactant and at least one anionic fatty alcohol-based sulfate surfactant; providing a granule-forming agent; mixing the anionic surfactant component and the granule-forming agent into a solid mixture; receiving the solid mixture in a granulation device, the granulation device having a first roller cutter and a second roller cutter, the first roller cutter includes a plurality of first blades and a plurality of first grooves positioned between each pair of adjacent first blades, the second roller cutter having a plurality of second blades and a plurality of second grooves positioned between each pair of adjacent second blades; cutting the solid mixture into a rough granule by cooperating the first blades with the second blades; and polishing the rough granule into the solid granule by friction rubbing between the first grooves and the second grooves.

The solid granule has a substantially spherical shape. The substantially spherical shape of the solid granule comprises a sphericity of at least 0.90. The solid granule having the substantially spherical shape has a diameter of at least 5 mm.

The plurality of first blades are placed in parallel with each other, and the plurality of second blades are placed in parallel with each other. The plurality of first blades are aligned with the plurality of second blades without contacting each other. The distances between adjacent first blades of the plurality of first blades and distances between adjacent second blades of the plurality of second blades are at least 5 mm. The solid mixture is in a form of a substantially circular cylindrical shape with a diameter of at least 5 mm.

The anionic sulfonate surfactant and the anionic fatty alcohol-based sulfate surfactant combined are in an amount of 15 wt. % to 75 wt. % based on a total amount of the solid granule being 100 wt. %, and the granule-forming agent is in an amount of 3 wt. % to 15 wt. % based on the total amount of the solid granule being 100 wt. %. A ratio of the amount of the anionic sulfonate surfactant to the amount of the anionic fatty alcohol-based sulfate surfactant is between 0.20 and 0.75. The solid granule has a cohesion between 1000 g/mm and 4000 g/mm. The solid granule has a firmness of at least 94%, which indicates a percentage in which the solid granule maintains its original size after being exposed to vibrations in a sieve shaker.

The present teachings also provide a method of manufacturing a solid granule for use as or in a cleaning agent. The method comprises providing an anionic surfactant component having at least one anionic sulfonate surfactant and at least one anionic fatty alcohol-based sulfate surfactant; providing a granule-forming agent; mixing the anionic surfactant component and the granule-forming agent and molding into a solid mixture; receiving the solid mixture in a granulation device, wherein the granulation device comprises a first roller cutter, a second roller cutter, a plurality of first circular blades included in the first roller cutter, the plurality of first circular blades being placed in parallel with each other, a plurality of first circular grooves positioned between adjacent first circular blades of the plurality of first circular blades, a plurality of second circular blades included in the second roller cutter, the plurality of second circular blades being placed in parallel with each other, and a plurality of second circular grooves positioned between adjacent second circular blades of the plurality of second circular blades; the plurality of first circular blades being aligned with the plurality of second circular blades without contacting each other; cutting the solid mixture into a rough granule by cooperating the first circular blades with the second circular blades; and polishing the rough granule into at a solid granule with a spherical shape having a sphericity of at least 0.95 by cooperating the first circular grooves with the second circular grooves. The solid granule has a diameter of at least 5 mm.

The solid mixture is in a form of a substantially circular cylindrical shape with a diameter of at least 5 mm. A ratio of the amount of the anionic sulfonate surfactant to the amount of the anionic fatty alcohol-based sulfate surfactant is between 0.20 and 0.75. The solid granule has a cohesion between 1000 g/mm and 4000 g/mm. The anionic surfactant component is in an amount of 15 wt. % to 75 wt. % based on a total amount of the solid granule being 100 wt. %, and the granule-forming agent is in an amount of 3 wt. % to 15 wt. % based on the total amount of the solid granule being 100 wt. %. The solid granule has a firmness of at least 94%, which indicates a percentage in which the solid granule maintains its original size after being exposed to vibrations in a sieve shaker. The method further comprises providing at least one functional material to be mixed and molded into the solid mixture, wherein the at least one functional material comprises a fragrance and/or an enzyme.

It is noted that all ranges disclosed herein with respect to wt. % and ratios may be inclusive of the upper and/or lower limits, unless otherwise indicated. As used herein, "about" or "approximately" means reasonably close to, or a little more or less than, the given number or range.

Other features and aspects of the present teachings will become apparent from the following detailed description, taken in conjunction with the accompanying drawings, which illustrate by way of example the features in accordance with embodiments of the present teachings. The summary is not intended to limit the scope of the present teachings, which is defined by the claims included herein.

BRIEF DESCRIPTION OF THE DRAWINGS

It should be understood that through the drawings corresponding reference numerals indicate like or corresponding parts and features.

DETAILED DESCRIPTION

The present teachings are described more fully hereinafter with reference to the accompanying drawings, in which the present embodiments are shown. The following description illustrates the present teachings by way of example, not by way of limitation of the principles of the present teachings.

The present teachings have been described in language more or less specific as to structural features. It is to be understood, however, that the present teachings are not limited to the specific features shown and described, since the product herein disclosed comprises preferred forms of putting the present teachings into effect.

Other than in the operating examples, or where otherwise indicated, all numbers expressing quantities of ingredients or reaction conditions used herein are to be understood as modified in all instances by the term "about".

Figure 1:
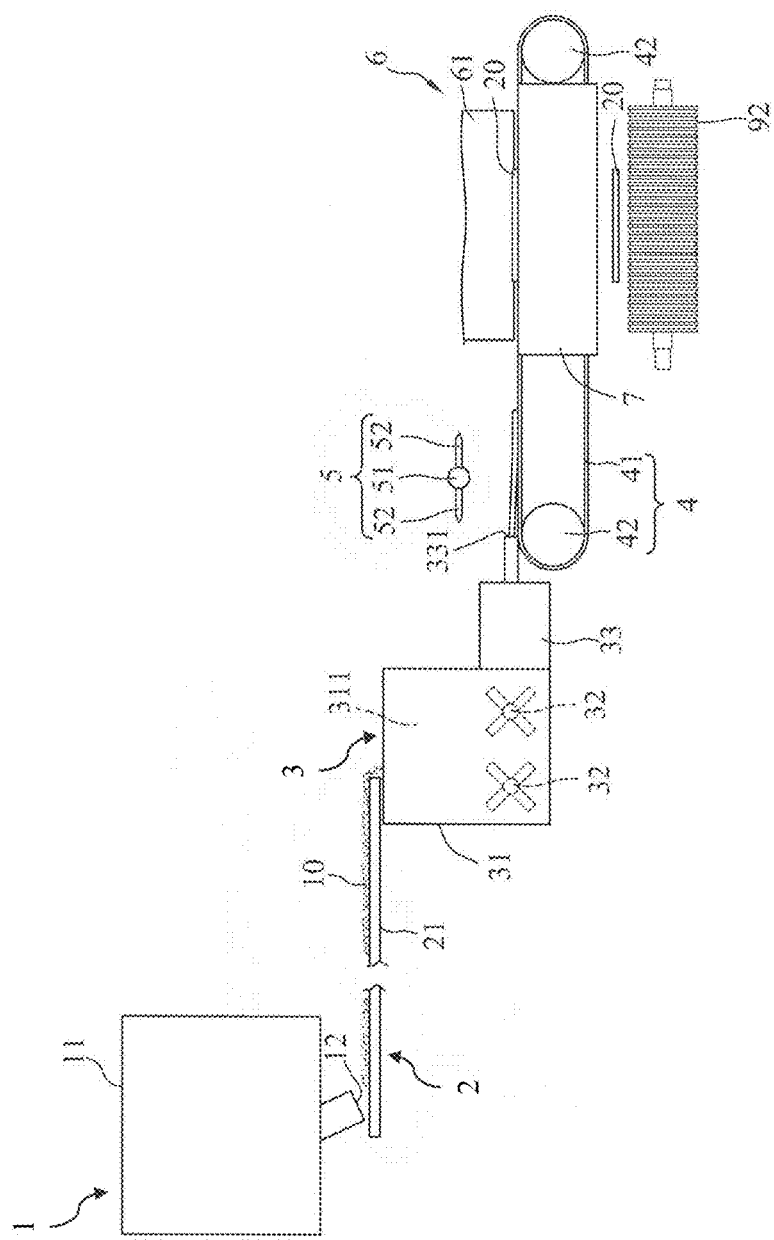
FIG. 1 is a side view of an exemplary system for manufacturing solid granules used for a cleaning agent according to one embodiment of the present teachings.
Figure 2:
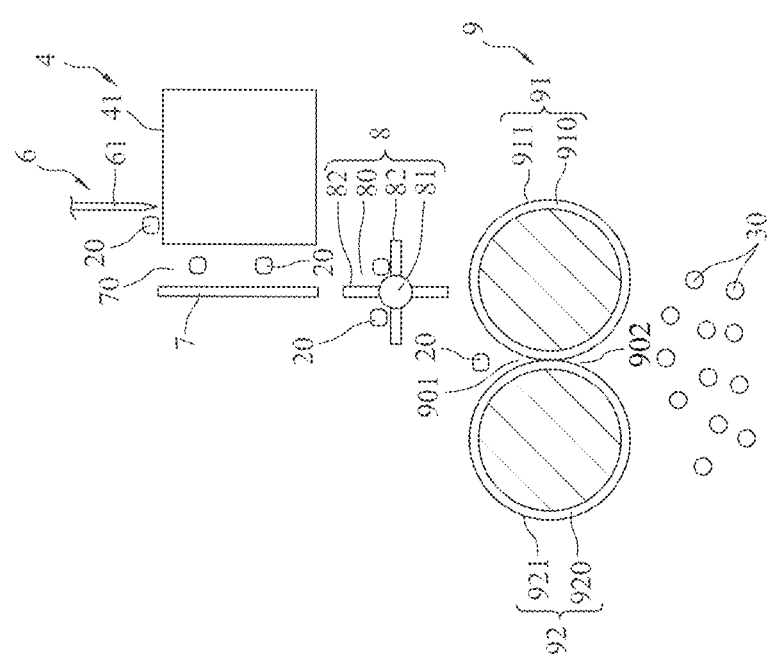
FIG. 2 is a front or rear view of a portion of the exemplary system of FIG. 1.

Referring to FIGS. 1 and 2, the system for manufacturing solid granules used for cleaning may include a mixing device 1, a molding device 3, and a granulation device 9. In one embodiment, the system may additionally include a conveyor 4 and a pushing device 6. In another embodiment, the system may additionally include a first conveyer 2, a second conveyer 4, a rolling blade cutter 5, a pushing device 6, a catching board 7, and a catching device 8.

The mixing device 1 may include a material input port 11 for receiving the materials to be mixed, a stirrer (not shown) for mixing the materials, and a material output port 12 for outputting the mixed materials. In some embodiments, the stirrer has a rotational speed in a range of 100 rpm to 300 rpm.

The molding device 3 may include a housing 31 including a container 311 for receiving the materials to be processed, an extruder 33 for extruding the materials in a pattern, and a circular output port 331 for outputting the patterned material. In one embodiment, the molding device 3 may include a plurality of mixing screws 32 (e.g., two) disposed within the housing 31. The mixing screws 32 are positioned substantially parallel to each other and rotate to thoroughly mix the materials into a smooth and uniform consistency. At least two of the mixing screws counter-rotate. In some embodiments, the circular output port 331 has a diameter of at least 5 mm. In some embodiments, the circular output port 331 has a diameter in a range of 5 mm to 12 mm. The material outputted from molding device 3 would exhibit enough solubility that allows the manufactured granules to be soluble.

Figure 3:
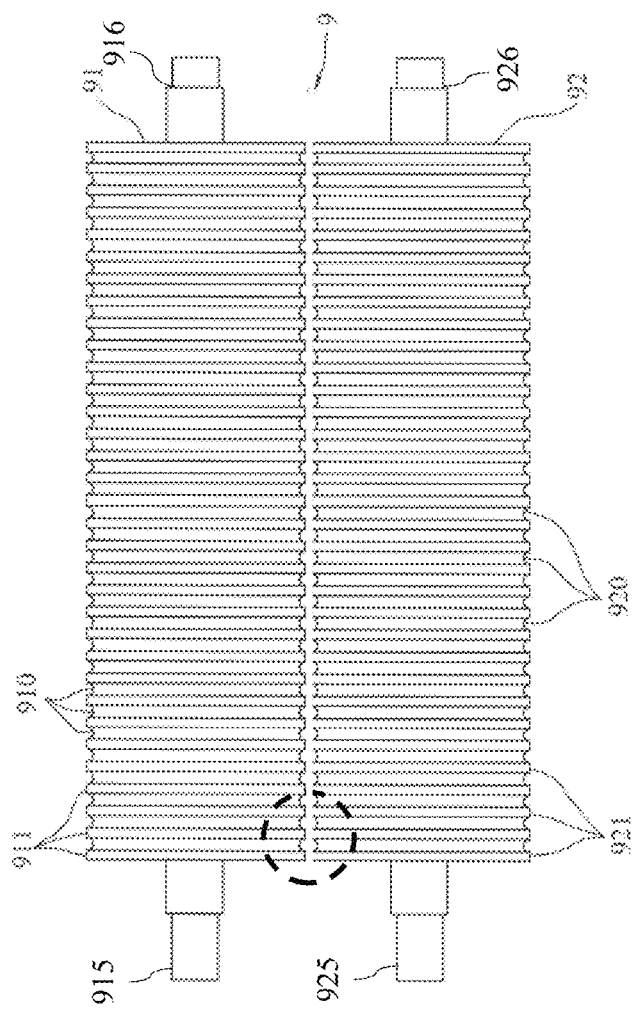
FIG. 3 is a top view of a granulation device included in the exemplary system of FIG. 1.

The granulation device 9, shown in FIGS. 1, 2 and 3, may include a first roller cutter 91 and a second roller cutter 92. The first roller cutter 91 and the second roller cutter 92 are placed in parallel and gaps are formed between the first roller cutter 91 and the second roller cutter 92. The size of the gap may be adjustable. A gap 901 defines an area configured as an input port for receiving the material. A gap 902 defines an area configured as an output port for outputting the resulted granules 30. A gap 903 defines an area configured for grinding and polishing the granules before outputting. The size of the gap 903 is adjusted to allow sufficient grinding and polishing of the granules before outputting to the gap 902.

It should be understood by a person of ordinary skill in the art that the first roller cutter and the second roller cutter preferably have a substantially right circular cylinder shape and are placed substantially in parallel with each other. Herein, the roller cutter in a substantially right circular cylinder shape means that the contour of the roller cutter, excluding the blades and/or the grooves configured thereon, is a right circular cylinder or near a right circular cylinder (i.e., the top and the bottom of the right circular cylinder are not the same size and are slightly different); the first roller cutter and the second roller cutter placed in parallel means that the longitudinal axis of the first roller cutter and the longitudinal axis of the second roller cutter are in parallel or near parallel (i.e., within a 10 degree difference).

The first roller cutter 91 has a right circular cylinder-shape component and two extenders 915, 916 along the central longitudinal axis of the cylinder. On the cylindrical surface of the first roller cutter 91, there are several circular blades 911 and several circular grooves 910 separating or providing spacing between the circular blades 911. The circular blades 911 are placed in parallel with each other. The circular blades 911 may or may not be perpendicular to the longitudinal axis of the first roller cutter. In some embodiments, the distance between the adjacent circular blades 911 is at least 5 mm. In some embodiments, the distance between the adjacent circular blades 911 is in a range of 5 mm to 12 mm.

The second roller cutter 92 has a right circular cylinder-shape component and two extenders 925, 926 along the central longitudinal axis of the cylinder. On the cylindrical surface of the second roller cutter 92, there are several circular blades 921 and several circular grooves 920 separating or providing spacing between the circular blades 921. The circular blades 921 are placed in parallel with each other. The circular blades 921 may or may not be perpendicular to the longitudinal axis of the second roller cutter. In some embodiments, the distance between the adjacent circular blades 921 is at least 5 mm. In some embodiments, the distance between the adjacent circular blades 921 is in a range of 5 mm to 12 mm.

Herein, the term "circular blades" means that the blades are placed on the peripheral surface of the cylinder-shape roller cutter, being circular when viewed in the cross-section from a plane that is perpendicular to the longitudinal axis of the roller cutter. The term "circular grooves" means that the grooves are placed on the peripheral surface of the cylinder-shape roller cutter, being circular when viewed in the cross-section from a plane that is perpendicular to the longitudinal axis of the roller cutter.

To produce a spherical granule, the separation distance between the adjacent circular blades 911/921 should be equal to or less than the diameter of the circular output port 311 of the molding device 3. In some embodiments, the diameter of the circular output port 331 of the molding device 3 and the distance between the adjacent circular blades 911/921 are substantially same. The diameter of the circular output port 331 of the molding device 3 and the distance between the adjacent circular blades 911/921 together control the size of the granule produced.

The circular blades 911 and the circular blades 921 are designed to cut a bar/strip-shaped material into granules. The circular grooves 910 and the circular grooves 920 are configured to grind or polish the granules into fine granules. As such, the circular blade 911 has its corresponding circular blade 921, and the circular groove 910 has its corresponding circular groove 920. Specifically, each pair of corresponding circular blades 911 and 921 cooperate to cut the bar/strip-shaped material without contacting each other, and each pair of corresponding circular grooves 910 and 920 contact with the granules and make the granules move between them to grind or polish the granules.

Figure 3A:
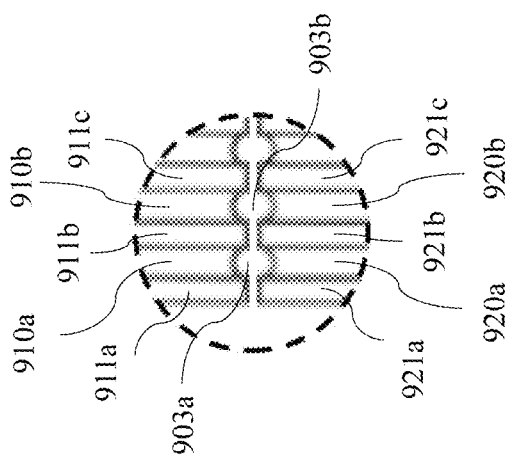
FIG. 3A is an enlarged view of the dash-circled area of FIG. 3.

For example, as shown in FIG. 3A, the circular blades 911a and 921a are align without contacting each other, the circular blades 911b and 921b are align without contacting each other, and the circular blades 911c and 921c are align without contacting each other. A space 903a is formed by the circular grooves 910a and 920a to grind or polish a granule, and a space 903b is formed by the circular grooves 910b and 920b to grind or polish another granule. When a granule(s) is received in the space 903a, the granule(s) contacts with each of the circular grooves 910a and 920a and moves with respect to each of the circular grooves 910a and 920a to be grinded or polished. When a granule(s) is received in the space 903b, the granule(s) contacts with each of the circular grooves 910b and 920b and moves with respect to each of the circular grooves 910b and 920b to be grinded or polished.

In one embodiment, the circular grooves have a flat surface. The term "flat surface" means that when viewed in the cross-section from a plane having the central longitudinal axis of the roller cutter, at least the bottom surface of the groove is flat. In another embodiment, the circular grooves have a curved surface, and preferably a curved surface with constant radius, as shown in FIG. 3A. The term "curved surface" means that when viewed in the cross-section from a plane having the central longitudinal axis of the roller cutter, the bottom surface and sides of the groove are curved.

The radius of the curved surface of the circular grooves may be large enough to provide sufficient contact with the granules for grinding and polishing, resulting in a better sphericity of the granules. The granules are outputted only after the granules are sufficiently grinded or polished in the space 903 to pass through the space 903.

In some embodiments, the corresponding circular blades 911 and 921 are aligned as shown in FIG. 3. However, it should be understood by a person of ordinary skills in the art that the corresponding circular blades 911 and 921 are not necessarily aligned, as long as the circular blades 911 and 921 cut the material into granules and the circular grooves 910 and 920 grind or polish the granules according to the present teachings.

In some embodiments, to produce granules with a uniform-size, spherical shape and good sphericity, the distances between the adjacent circular blades 911 and the distances between the adjacent circular blades 921 are uniform and are the same, the depths of the grooves 911 and the depths of the grooves 921 are uniform and are the same, and the surfaces of the grooves 911 and the surfaces of the grooves 921 are uniform and are the same.

In one embodiment where the system additionally includes a conveyor 4 and a pushing device 6, the conveyor 4 may include a conveying belt 41 and at least two pulleys 42 for rotating to transport the materials on the conveying belt from one location to another location. The pushing device 6 is placed above the conveying belt 41 and may include an arm 61 for pushing the materials on the conveying belt 41 off the conveying belt 41. The arm 61 may further include a motor for powering the arm 61.

In another embodiment where the system additionally includes a first conveyor 2, a second conveyor 4, a rolling blade cutter 5, a pushing device 6, a catching board 7, and a catching device 8, the first conveyor 2 may include a conveying belt 21 to transport the material on the conveying belt from one location to another location. The second conveyor 4 may include a conveying belt 41 and at least two pulleys 42 for rotating to transport the materials on the conveying belt from one place to another place. The rolling blade cutter 5 is placed above the conveying belt 41 to cut the materials on the conveying belt 41 and may include a rotating component 51 and blades 52. The pushing device 6 is placed above the conveying belt 41 and may include an arm 61 for pushing the materials on the conveying belt 41 off the conveying belt 41. The arm 61 may further include a motor for powering the arm 61. The catching board 7 is placed at a side of the second conveyor 4 with a space 70 between the catching board 7 and the second conveyor 4, and the catching device 8 is placed under the catching board to form a catching space 80 to catch the material that has been pushed off the conveying belt 41 and prevent the material falling in other directions. The catching device 8 may include a rotating component 81 and catching plates 82 so that the caught material is dropped off through the rotation of the catching plates 82.

Figure 4:
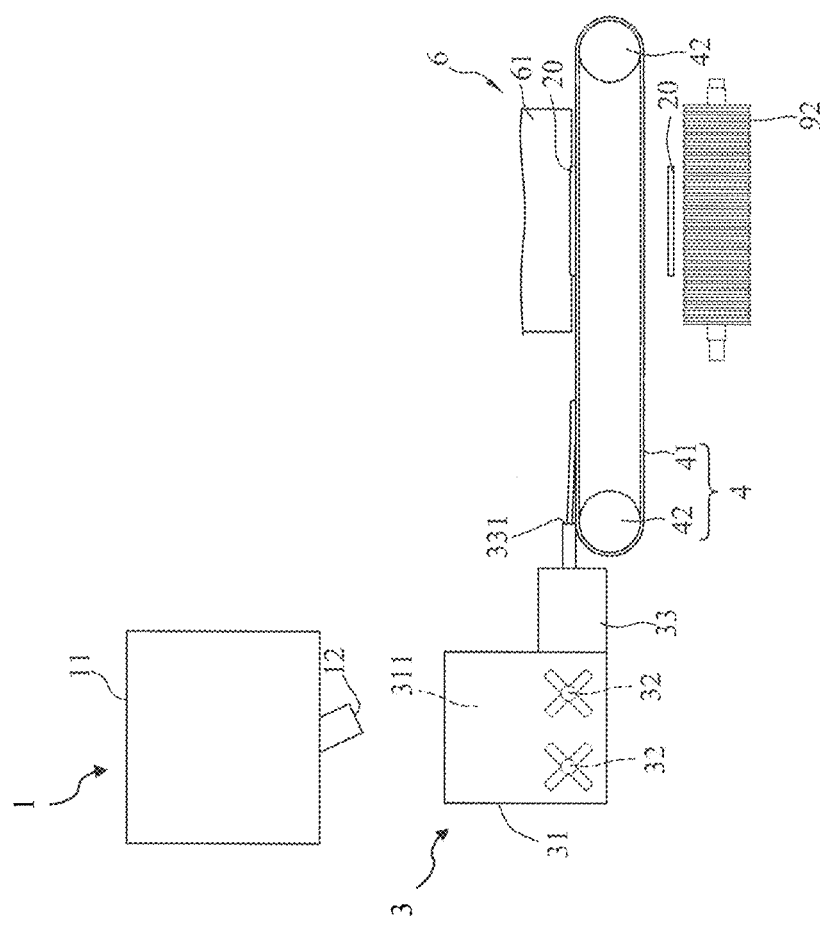
FIG. 4 is a side view of an exemplary system for manufacturing solid granules used for a cleaning agent according to another embodiment of the present teachings.
Figure 5:
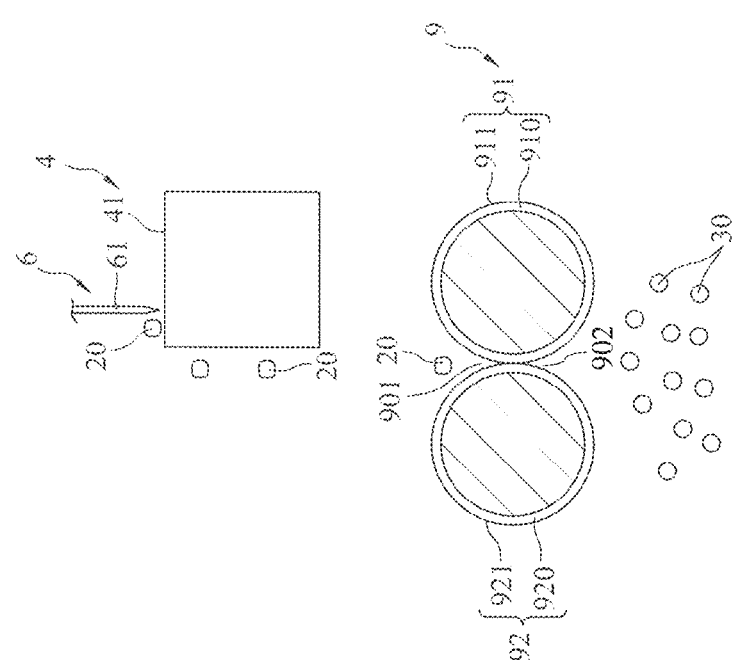
FIG. 5 is a front or rear view of a portion of the exemplary system of FIG. 4.

Now referring to FIGS. 4 and 5, in one embodiment, the raw materials are fed into the mixing device 1 via the material input port 11 and are stirred in the stirrer of the mixing device 1 to form a cleaning composition 10 (not shown). The stirrer has a rotational speed of 175 rpm. The cleaning composition 10 is outputted via the material output port 12 and fed into the molding device 3.

In the molding device 3, the cleaning composition 10 is placed in the container 311. The cleaning composition 10 is stirred and mixed by two screws 32 and sent to the molding press 33 to be pressed into compressed material. The compressed material is pushed out via the circular output port 331 to form a cylindrical bar 20. In some embodiments, the cylindrical bar 20 has a diameter at least 5 mm. In some embodiments, the cylindrical bar 20 has a diameter in a range of 5 mm to 12 mm. In some embodiments, each of two screws 32 has a rotational speed in a range of 25 rpm to 80 rpm. In one embodiment as used in the Inventive Examples 1-4, each of two screws 32 has a rotational speed of 45 rpm.

The cylindrical bar 20 is delivered to the conveyor 4 and transported via the conveying belt 41. At a place where the pushing device 6 is positioned above, the cylindrical bar 20, moving with the conveying belt 41, is pushed by the arm 61 off the conveying belt 41 and falls into the gap 901 of the granulation device 9. The circular blades 911 and the circular blades 921 are configured to cut the cylindrical bar 20 into coarse solid granules. The circular grooves 910 and the circular grooves 920 may grind the coarse solid granules into fine solid granules 30.

Referring back to FIGS. 1 and 2, in another embodiment as shown in FIGS. 1 and 2, the raw materials are fed into the mixing device 1 via the material input port 11 and are stirred in the stirrer of the mixing device 1 to form a cleaning composition 10. The stirrer has a rotational speed of 175 rpm. The cleaning composition 10 is discharged via the material output port 12, transported via the conveying belt 21, and fed into the molding device 3.

In the molding device 3, the cleaning composition 10 is placed in the container 311. The cleaning composition 10 is stirred and mixed by two screws 32 and sent to the molding press 33 to be pressed into compressed material. The compressed material is pushed out via the circular output port 331 to form a cylindrical bar 20. In some embodiments, the cylindrical bar 20 has a diameter at least 5 mm. In some embodiments, the cylindrical bar 20 has a diameter in a range of 5 mm to 12 mm. In some embodiments, the cleaning material 10 is stirred and mixed within the temperature of 15° C. to 45° C. and relative humidity of 0% to 60%. In some embodiments, each of two screws 32 has a rotational speed in a range of 25 rpm to 80 rpm.

The cylindrical bar 20 is delivered to the conveyor 4 and transported via the conveying belt 41. The blades 52 cut the cylindrical bar 20 into small pieces on the conveying belt 41 at a place where the rolling blade cutter 5 is positioned above. At the place where the pushing device 6 is positioned above, the cylindrical bar 20, moving with the conveying belt 41, is pushed by the arm 61 off the conveying belt 41 and falls through the space 70 into the catching space 80 and lands on the catching plates 82. The catching plates 82 is rotated to drop off the cylindrical bar 20 into the gap 901 of the granulation device 9.

The circular blades 911 and the circular blades 921 cooperate to cut the cylindrical bar 20 into coarse solid granules. The circular grooves 910 and the circular grooves 920 may grind the coarse solid granules into fine solid granules 30.

As the systems and methods of manufacturing solid granules for cleaning have been described above, the raw materials and ingredients for manufacturing such solid granules will be described below.

In one embodiment, the raw materials may include a surfactant component, a granule-forming (binding and/or molding) agent, and functional materials including fragrances or/and enzymes. In some embodiments, the raw materials may include additional ingredients including for example, but are not limited to, disintegrates, bittering agents, chelating agents, and alkali agents.

Surfactant Component

In one embodiment, the raw materials may include at least one surfactant component. The surfactant component includes at least one anionic sulfonate surfactant and at least one anionic fatty alcohol-based sulfate surfactant. In some embodiments, two or more different types of sulfonate surfactants may be used in the surfactant component. In other embodiments, two or more different types of sulphate surfactants may be used in the surfactant component. It is understood to a person of ordinary skill in the art that any number of sulfonate surfactants may be combined with any number of sulfate surfactants to form the surfactant component.

The anionic sulfonate surfactant may comprise, but is not limited to, a fatty acid ester sulfonate, an aliphatic sulfonate, fluorenyl taurate, etc. The fatty acid ester sulfonate can be used alone or in combination with other types of sulfonate surfactants. The fatty acid ester sulfonate may be, for example, but is not limited to, sodium fatty acid methyl ester sulfonate, sodium fatty acid ethyl sulfonate (sodium fatty acid ethyl ester sulfonate), sodium dioctyl sulfosuccinate, or any combination thereof. The fatty acid ester sulfonate is selected from $C_8$-$C_{20}$ fatty acid ester sulfonate, and may preferably be selected from $C_{10}$-$C_{18}$ fatty acid ester sulfonate. The aliphatic sulfonate can be used alone or in combination with other types of sulfonate surfactants. The aliphatic sulfonate may be, for example, but is not limited to, a secondary alkyl sulfonate or a combination of secondary alkyl sulfonates. The secondary alkyl sulfonate is selected from $C_8$-$C_{18}$ secondary alkyl sulfonate, and may preferably be selected from $C_{14}$-$C_{17}$ secondary alkyl sulfonate. The secondary alkyl sulfonate may be, for example, but is not limited to, sodium secondary alkyl sulfonate. The fluorenyl taurate may be, for example, but is not limited to, sodium methyl stearoyl taurate, sodium methyl myristoyl taurate, sodium methyl cocoyl taurate, or any combination thereof.

The anionic fatty alcohol-based sulfate surfactant can be used alone or in combination with other types of sulfate surfactants. The anionic fatty alcohol-based sulfate surfactant may be, for example, but is not limited to, fatty alcohol sulfate, fatty alcohol ether sulfate, or a combination thereof. The fatty alcohol sulfate may be, but is not limited to, sodium lauryl sulfate, sodium coco-sulfate, a like ingredient, or any combination thereof. The fatty alcohol ether sulfate may be, but is not limited to, sodium laureth sulfate.

Granule-Forming (Binding and/or Molding) Agent

In one embodiment, the raw materials may include at least one granule-forming agent (binding and/or molding agent). The granule-forming agent (binding and/or molding agent) is, for example, a polyol molding agent. The forming agent may be used alone or in combination with other molding agents. The forming agent may be, for example, but is not limited to, glycerin, propylene glycol, butylene glycol (butanediol), caprylyl glycol, ethylhexyl glycerin, sucrose, trehalose, sorbose, melezitose, sorbitol, stathiose, raffinose, fructose, mannose, maltose, lactose, arabinose, xylose, ribose, rhamnose, galactose, glucose, mannitol, xylitol, erythritol, threitol, polyethylene glycol, a similar polyhydric alcohol, or any combination thereof. The forming agent is configured to help the components of the cleaning composition 10 agglomerate with one another, and provide the cleaning composition 10 with sufficient plasticity, elasticity, and lubricity. The granule will have a softness similar to dough. Therefore, in manufacturing the cleaning granule, during a molding process, the cleaning composition 10 is able to smoothly pass through the output port 331 of the molding device 3 without accumulating at the output port 331, thereby preventing or at least minimizing the chance of a blockage or clogging. In addition, the forming agent may be configured to make an object being cleaned (e.g., clothes) soft.

Functional Material Including Fragrance Component and Enzyme Component

In order to give the cleaning granule a scent, the cleaning granules 30 may include a fragrance component. The fragrance component includes at least one perfume. The at least one perfume may be, for example, but is not limited to, an essential oil. The essential oil can comprise orange oil, lavender oil, peppermint oil, lemon oil, eucalyptus oil, tea tree oil, lemon grass oil, chamomile oil, etc., or any combination thereof.

In order to improve or increase the cleaning power of the cleaning granule 30, an enzyme component may be included in the granule. The enzyme component also provides fabric care benefits. The enzyme component comprises at least one enzyme. The at least one enzyme may be, for example, but is not limited to, hemicellulase, peroxidase, protease, cellulase, xylanase, lipase, phospholipase, esterase, cutinase, pectinase, mannanase, pectate lyase, keratinase, reductase, oxidase, phenol oxidase, lipoxygenase, ligninase, pullulanase, tannases, pentosanases, malanases, β-glucanases, arabinosidases, hyaluronidases, chondroitinases, laccases and amylases, or any combination thereof.

Additional Ingredients

The raw material may comprise one or more further ingredients to provide additional characteristics and functions to the cleaning granule 30. The further ingredients may be applied as a coating around the main components of the cleaning granule 30. The addition of further ingredients to the granule layer by layer eventually forms multiple concentric coatings around the base granule. The order in which each further ingredient is added to the granule may depend on the type and functionality of the further ingredients. In addition to or alternatively, the further ingredient(s) may be encapsulated by the main components of the cleaning granule 30. Further, in addition to or alternatively, the further ingredient(s) may be mixed uniformly with the main components of the granule.

One example of a further ingredient includes a viscosity-reducing agent (anti-sticking agent). One purpose of the anti-sticking agent is to prevent the cleaning granules 30 from sticking to one another and agglomerating during storage. The anti-sticking agent can be used alone or in combination. The anti-sticking agent can be, for example, but is not limited to, layered sodium disilicate, zeolite (aluminosilicate), or any combination thereof. The zeolite in the cleaning granule 30 can be a natural zeolite or alternatively a synthetic zeolite, which is purer than natural zeolites.

Another example of a further ingredient includes a disintegrant. The disintegrant is an agent that causes the cleaning granule to dissolve rapidly on contact with moisture. The disintegrant may be used alone or in combination with other disintegrants. The disintegrant may be, for example, but is not limited to, cellulose-based materials, starch-based materials, acrylic materials, polyvinylpyrrolidone (polyvidone), tartaric acid, citric acid, sodium bicarbonate, or any combination thereof. The cellulose-based material may be, for example, but is not limited to, carboxymethyl cellulose, hydroxypropyl methylcellulose, a like ingredient, or any combination thereof. The starch-based material may be, for example, but is not limited to, corn starch, potato starch, a like ingredient, or any combination thereof.

In order to make the cleaning granules more effective in removing greasy soils and neutralizing acidic soils to avoid the odor caused by acidic soils, the further ingredient may also include an alkali agent. The alkali agent can be used alone or in combination with other like agents having similar effects. The alkali agent may be, for example, but is not limited to, sodium sulfate, sodium carbonate, sodium bicarbonate, sodium silicate, tetrasodium orthosilicate, or any combination thereof.

The further ingredient may also include a chelating agent that makes it have increased or enhanced cleaning power in hard water or water with high hardness (for example, 150 or more (ppm or mg/L)). The chelating agent helps to remove scale, soften the water and boost the hygienic cleaning action. The chelating agent may be used alone or in combination. The chelating agent may be, for example, but is not limited to, sodium gluconate, sodium citrate, potassium citrate, glutamic acid diacetate, tetrasodium glutamate diacetate, etc., or any combination thereof. Other suitable chelants include diethylene triamine pentaacetate, diethylene triamine penta(methyl phosphonic acid), ethylene diamine-N'N'-disuccinic acid, ethylene diamine tetraacetate, ethylene diamine tetra(methylene phosphonic acid) and hydroxyethane di(methylene phosphonic acid). In some embodiments, the chelant is ethylene diamine-N'N'-disuccinic acid (EDDS) and/or hydroxyethane diphosphonic acid (HEDP). The solid granule composition may preferably comprise ethylene diamine-N'N'-disuccinic acid or salt thereof. The ethylene diamine-N'N'-disuccinic acid may for example be in S'S' enantiomeric form. In some embodiments, the solid granule comprises 4,5-dihydroxy-m-benzenedisultonic acid disodium salt.

One concern with conventional powder cleaning products is the accidental poisoning of a person, child, or pet when the product is ingested. In order to reduce the likelihood of ingestion of the cleaning granule, a further ingredient of the cleaning granule of the present teachings may include an irritating-flavor agent. The irritating-flavor agent imparts an offensive taste to the cleaning granule for the purpose of inducing the person or pet to spit out the cleaning granule prior to being ingested. The irritating-flavor agent can be used alone or in combination, and can be, for example, but is not limited to, a bittering agent. The bittering agent may comprise denatonium benzoate, naringin, sucrose octaacetate, caffeine, quinine, theobromine, etc., or any combination thereof. Preferably, the irritating-flavor agent is applied to the granule as the outermost layer if other further ingredients are added to the granule in order to ensure immediate effect. This means that other further ingredients, such as the disintegrant, fragrance component, enzyme component, alkali agent, and/or chelating agent are disposed within the interior of the layer of irritating-flavor agent.

The further ingredient may also include an anti-redeposition agent that prevents the redeposition of stains. The anti-redeposition agent may be used alone or in combination. The anti-redeposition agent may be, for example, but is not limited to, acrylic polymer, polyvinylpyrrolidone, hydroxyethylcellulose, etc., or any combination thereof. In some embodiments, the anti-redeposition agent is the same as the disintegrant agent, constituting one component for two functions. In some embodiments, the anti-redeposition agent uses the same ingredient such as acrylic polymer, polyvinylpyrrolidone, hydroxyethylcellulose as the disintegrant agent, but constituting two components each for different functions.

In some embodiments, the raw material may contain 15 wt. % to 75 wt. % surfactant component, 3 wt. % to 15 wt. % granule-forming agent, 5 wt. % to 50 wt. % alkali agent, 0.3 wt. % to 5 wt. % chelating agent, 0.1 wt. % to 20 wt. % enzyme component, and 0.1 wt. % to 5 wt. % fragrance component. In preferred embodiments, the raw material may contain 15 wt. % to 60 wt. % surfactant component, 3 wt. % to 10 wt. % granule-forming agent, 5 wt. % to 30 wt. % alkali agent, 0.3 wt. % to 3 wt. % chelating agent, 0.25 wt. % to 2 wt. % enzyme component, and 0.2 wt. % to 3 wt. % fragrance component.

It should be understood that the weight percentages disclosed regarding the raw material may be applicable to the resulting granule. That is, the amount ratio for each component in the raw materials may be substantially same to that of the manufactured solid granule.

In one embodiment as used in the Inventive Examples 1-4, the raw material may contain 60 wt. % surfactant component, 5 wt. % granule-forming agent, 20 wt. % alkali agent, 10 wt. % chelating agent, 3 wt. % enzyme component, and 2 wt. % fragrance component (e.g., essential oil).

In order to reduce the dust particles of the cleaning granule and/or to reduce the ingress of moisture or air into the cleaning granule which could cause the enzyme component or the fragrance component to lose its effect, the cleaning granule 30 may have an outer protective coating so that these active ingredients (e.g., fragrance, enzyme) remain stable and stably exist in the cleaning granule under long-term storage. In some embodiments, the active ingredients may be encapsulated by the mixture of the surfactants, the viscosity-reducing agent, and the granule-forming agent. As a result, the cleaning granule 30 can maintain a persistent scent throughout its storage life and can maintain the cleaning power throughout its storage life.

The cleaning granule 30 according to the present teachings may be incorporated into or used to form various cleaning products, such as laundry detergents, detergents for kitchen utensils and dishware, bathroom cleaners, body soap or cleaners (for human or pet), bathing agents, or the like. Specifically, the present teachings provide for a laundry detergent, dishwasher cleaner, dishwasher detergent, dish cleaner, kitchen cleaner, bathroom cleaner, toilet cleaner, sink cleaner, tub cleaner, tile cleaner, carpet/rug cleaner, all-purpose cleaner, floor cleaner, multi-surface cleaner, hand wash, or body wash containing one or more cleaning granules as described above. The cleaning granule 30 according to the present teachings may directly applied to items to be cleaned or dissolved into an aqueous solution and then applied to the items to be cleaned.

Various inventive examples of the cleaning granule 30 manufactured according to the present teachings with their respective evaluation factors are shown in Table 1. This table demonstrates the advantages that the cleaning granule 30 manufactured according to the present teachings has over comparative examples with respect to sphericity, sphere firmness, fragrance persistence, and/or other factors.

Inventive Examples 1 to 4

The Inventive Examples 1 to 4 were performed using the method illustrated with FIGS. 4 and 5, except for the different diameters of the circular output port 331 and the different distances of the circular blades 911/921. The distances of the circular blades 911/912 herein refer to a distance that is same as the unified distances between the adjacent circular blades 911 and the unified distances between the adjacent circular blades 921.

In the Inventive Example 1, the diameter of the circular output port 311 is 5 mm, and the distances of the circular blades 911/921 are 5 mm.

In the Inventive Example 2, the diameter of the circular output port 311 is 8 mm, and the distances of the circular blades 911/921 are 8 mm.

In the Inventive Example 3, the diameter of the circular output port 311 is 10 mm, and the distances of the circular blades 911/921 are 10 mm.

In the Inventive Example 4, the diameter of the circular output port 311 is 12 mm, and the distances of the circular blades 911/921 are 12 mm.

Comparative Examples 1 to 5

The raw material used in the Comparative Examples 1 to 5 is the same as that in the Inventive Examples 1 to 4, which may contain 60 wt. % surfactant component, 5 wt. % granule-forming agent, 20 wt. % alkali agent, 10 wt. % chelating agent, 3 wt. % enzyme component, and 2 wt. % fragrance component (e.g., essential oil).

The Comparative Examples 1 to 5 were performed using the prior art machine to make material blocks. The material blocks were input into prior art squeeze machine to form material bars. The material bars were cut into pieces with length of 0.5 cm to 1.5 cm. Then, the cut pieces were input into a prior art centrifugal round granulation machine (INORA, Model #YS-BG-1) with an output port having different diameters. In the Comparative Example 1, the diameter of the output port is 5 mm. In the Comparative Example 2, the diameter of the output port is 8 mm. In the Comparative Example 3, the diameter of the output port is 10 mm. In the Comparative Example 4, the diameter of the output port is 3 mm. In the Comparative Example 5, the diameter of the output port is 1 mm.

Evaluation/Test Items

Measurement of particle size (unit: mm): used a digital thickness gauge (e.g., Mitutoyo) to measure particle size of Inventive Examples 1 to 4 and Comparative Examples 1 to 5.

Spherical Measurement: used a camera (e.g., Olympus Tough TG-6) and ImageJ software to measure the dimensions of the shortest side and longest side of Inventive Examples 1 to 4 and Comparative Examples 1 to 5; thereafter, applied the short side and long side dimensions to the following formula to calculate the sphericity: sphericity=shortest side size/longest side size. Sphericity greater than 0.9 is a granular material that can be continuously rolled.

Sphere Firmness Measurement: Inventive Examples 1 to 4 and Comparative Examples 1 to 5 were placed in a container of a shaking device for shaking under a 100 times/min frequency for 10 minutes and filtered with a sieve, and then were measured for the sizes to calculate the ratio (unit: %) compared with the original sizes. The higher the ratio of maintaining the original sizes of the cleaning particles, the lower the degree of rupture or fragmentation of the cleaning particles and the better the sphere firmness.

Fragrance Persistence Measurement (unit: week): Inventive Examples 1 to 4 and Comparative Example 1 to 5 were placed in an environment with a temperature set at 45° C. for 12 weeks. The fragrance evaluation was performed by 20 reviewers at the end of 12 weeks, and each reviewer scored the fragrance compared with a Control Group 1 and a Control Group 2, and then average scores were calculated. Control Group 1 includes newly manufactured particles; Control Group 2 includes newly manufactured particles with the added fragrance amount halved. The scent score 5 indicates that the scent intensity is equivalent to that of Control Group 1; the scent score 4 indicates that the scent intensity is between that of Control Group 1 and that of Control Group 2; the scent score 3 indicates that the scent intensity is equivalent to that of Control Group 2; the scent score 2 indicates that the scent intensity is lower than that of Control Group 2 but better than no fragrance; the scent score 1 indicates no fragrance.

TABLE 1

| Evaluation Test | Inventive Examples | | | | Comparative Examples | | | | |
|---|---|---|---|---|---|---|---|---|---|
| | 1 | 2 | 3 | 4 | 1 | 2 | 3 | 4 | 5 |
| Particle Size (mm) | 5 | 8 | 10 | 12 | N/A | N/A | N/A | 3 | 1 |
| Sphericity | 0.99 | 1.00 | 1.00 | 1.00 | N/A | N/A | N/A | 0.75 | 0.80 |
| Sphere Firmness (%) | 95 | 94 | 95 | 95 | N/A | N/A | N/A | 75 | 90 |
| Fragrance Persistence | 4 | 4 | 4 | 4.5 | N/A | N/A | N/A | 2 | 2 |

"N/A" herein means that no measurable granules are produced due to sticking to each other and agglomerating during the granulation process.

Therefore, through the granulation device 9, the method for preparing cleaning granules according to the present teachings can obtain spherical solid granules 30 having a diameter of at least 5 mm and a sphericity of at least 0.95. The spherical solid granules 30, during storage, can have the functional material enclosed so as to prevent the functional material from weakening in strength or escaping. In addition, the spherical solid granules 30 is not likely to be broken due to collision during transportation or packaging, and thus, the functional material will not be exposed to or have contact with air or moisture, thereby preventing the functional material from weakening or escaping.

It should be understood to a person of ordinary skill in the art that different configurations of the solid granule are possible. For example, the arrangement and order of the components of the solid granule may differ from those described in the above written description and figures without departing from the scope and spirit of the present teachings. The components included in the solid granule may also differ from those described in the above written description and figures without departing from the scope and spirit of the present teachings.

While the present teachings have been described above in terms of specific embodiments, it is to be understood that they are not limited to those disclosed embodiments. Many modifications and other embodiments will come to mind to those skilled in the art to which this pertains, and which are intended to be and are covered by both this disclosure and the appended claims. For example, in some instances, one or more features disclosed in connection with one embodiment can be used alone or in combination with one or more features of one or more other embodiments. It is intended that the scope of the present teachings should be determined by proper interpretation and construction of any claims and their legal equivalents, as understood by those of skill in the art relying upon the disclosure in this specification and the attached drawings.

What is claimed is:

1. A method of manufacturing a solid granule for use as or in a cleaning agent, comprising:
   providing an anionic surfactant component having at least one anionic sulfonate surfactant and at least one anionic fatty alcohol-based sulfate surfactant;
   providing a granule-forming agent;
   mixing the anionic surfactant component and the granule-forming agent into a solid mixture;
   receiving the solid mixture in a granulation device, the granulation device having a first roller cutter and a second roller cutter, the first roller cutter includes a plurality of first blades and a plurality of first grooves positioned between each pair of adjacent first blades, the second roller cutter having a plurality of second blades and a plurality of second grooves positioned between each pair of adjacent second blades;
   cutting the solid mixture into a rough granule by cooperating the first blades with the second blades; and
   polishing the rough granule into the solid granule with a spherical shape by friction rubbing between the first grooves and the second grooves.

2. The method of claim 1, wherein the spherical shape of the solid granule comprises a sphericity of at least 0.95.

3. The method of claim 1, wherein the solid granule having the spherical shape has a diameter of at least 5 mm.

4. The method of claim 1, wherein the plurality of first blades are placed in parallel with each other, and the plurality of second blades are placed in parallel with each other.

5. The method of claim 1, wherein the plurality of first blades are aligned with the plurality of second blades without contacting each other.

6. The method of claim 1, wherein a distance between adjacent first blades of the plurality of first blades and a distance between adjacent second blades of the plurality of second blades are at least 5 mm.

7. The method of claim 1, wherein the solid mixture is in a form of a substantially circular cylindrical shape with a diameter of at least 5 mm.

8. The method of claim 1, wherein the anionic sulfonate surfactant and the anionic fatty alcohol-based sulfate surfactant combined are in an amount of 15 wt. % to 75 wt. % based on a total amount of the solid granule being 100 wt. %, and the granule-forming agent is in an amount of 3 wt. % to 15 wt. % based on the total amount of the solid granule being 100 wt. %.

9. The method of claim 1, wherein a ratio of the amount of the anionic sulfonate surfactant to the amount of the anionic fatty alcohol-based sulfate surfactant is between 0.20 and 0.75.

10. The method of claim 1, wherein the solid granule has a cohesion between 1000 g/mm and 4000 g/mm.

11. The method of claim 1, wherein the solid granule has a firmness of at least 94%, which indicates a percentage in which the solid granule maintains its original size after being exposed to vibrations in a sieve shaker.

12. A method of manufacturing a solid granule for use as or in a cleaning agent, comprising:
    providing an anionic surfactant component having at least one anionic sulfonate surfactant and at least one anionic fatty alcohol-based sulfate surfactant;
    providing a granule-forming agent;
    mixing the anionic surfactant component and the granule-forming agent and molding into a solid mixture;
    receiving the solid mixture in a granulation device, wherein the granulation device comprises a first roller cutter, a second roller cutter, a plurality of first circular blades included in the first roller cutter, the plurality of first circular blades being placed in parallel with each other, a plurality of first circular grooves positioned between adjacent first circular blades of the plurality of first circular blades, a plurality of second circular blades included in the second roller cutter, the plurality of second circular blades being placed in parallel with each other, and a plurality of second circular grooves positioned between adjacent second circular blades of the plurality of second circular blades; the plurality of first circular blades being aligned with the plurality of second circular blades without contacting each other;
    cutting the solid mixture into a rough granule by cooperating the first circular blades with the second circular blades; and
    polishing the rough granule into a solid granule with a spherical shape having a sphericity of at least 0.95 by cooperating the first circular grooves with the second circular grooves.

13. The method of claim 12, wherein the solid granule has a diameter of at least 5 mm.

14. The method of claim 12, wherein the solid mixture is in a form of a substantially circular cylindrical shape with a diameter of at least 5 mm.

15. The method of claim 12, wherein a ratio of the amount of the anionic sulfonate surfactant to the amount of the anionic fatty alcohol-based sulfate surfactant is between 0.20 and 0.75.

16. The method of claim 12, wherein the solid granule has a cohesion between 1000 g/mm and 4000 g/mm.

17. The method of claim 12, wherein the anionic surfactant component is in an amount of 15 wt. % to 75 wt. % based on a total amount of the solid granule being 100 wt. %, and the granule-forming agent is in an amount of 3 wt. % to 15 wt. % based on the total amount of the solid granule being 100 wt. %.

18. The method of claim 12, wherein the solid granule has a firmness of at least 94%, which indicates a percentage in which the solid granule maintains its original size after being exposed to vibrations in a sieve shaker.

19. The method of claim 12, further comprising providing at least one functional material to be mixed and molded into the solid mixture, wherein the at least one functional material comprises a fragrance and/or an enzyme.

* * * * *